United States Patent

[11] 3,580,994

[72] Inventor Yoshiteru Kosaka
Kamakura, Japan
[21] Appl. No. 778,666
[22] Filed Nov. 25, 1968
[45] Patented May 25, 1971
[73] Assignee Victor Company of Japan, Limited
Yokohama, Japan
[32] Priority Nov. 27, 1967
[33] Japan
[31] 42/75,626 and 42/75,627

[54] SIGNAL EDITING SYSTEM FOR MAGNETIC RECORDING AND REPRODUCING APPARATUS
2 Claims, 8 Drawing Figs.

[52] U.S. Cl. .......... 178/6.6A, 178/6.6P, 179/100.2B, 179/100.2T
[51] Int. Cl. .......... G11b 5/04, G11b 27/02, H04n 5/78
[50] Field of Search .......... 178/6.6 A, 6 F&M, 6.6 P; 179/100.2 B

[56] References Cited
UNITED STATES PATENTS
3,017,462 1/1962 Clark et al. .......... 178/6.6X
3,145,262 8/1964 Healey et al. .......... 178/6
3,176,067 3/1965 Machein et al. .......... 179/100.2
3,180,930 4/1965 Bounsall .......... 179/100.2

*Primary Examiner*—Bernard Konick
*Assistant Examiner*—Steven B. Pokotilow
*Attorney*—Louis Bernat

ABSTRACT: A signal editing system for magnetic recording and reproducing apparatus which records, on a magnetic tape on which one video signal is already recorded. The recording in either a second video signal from a television camera or video signals other than the second video signal, such as incoming signals of television receivers, for example. The new recording may start at a point on the magnetic tape which is halfway through the one video signal recorded thereon. The signal editing system provides means whereby the synchronizing signals of the two video signals can be brought into phase agreement with each other so that editing of the video signals can be effected without the occurrence of disturbance in synchronism.

INVENTOR

YOSHITERU KOSAKA

BY

ATTORNEY

Patented May 25, 1971 3,580,994

4 Sheets-Sheet 2

INVENTOR

YOSHITERU KOSAKA

BY Louis Bernat

ATTORNEY

INVENTOR

YOSHITERU KOSAKA

BY Louis Bernat

ATTORNEY

INVENTOR

YOSHITERU KOSAKA

BY

ATTORNEY

SIGNAL EDITING SYSTEM FOR MAGNETIC RECORDING AND REPRODUCING APPARATUS

The present invention relates to signal editing systems for magnetic recording and reproducing apparatus. In particular, the invention is concerned with a signal editing system for magnetic recording and reproducing apparatus for recording a new signal, on a magnetic tape on which one high frequency signal, such as a television signal, for example, is already recorded in the form of magnetic tracks. The new high frequency signal is also recorded in the form of magnetic tracks starting at a point on the magnetic tape which is half-way through the magnetic tracks of the original high frequency signal, whereby the magnetic tracks for the two high frequency signals can be reproduced smoothly in succession.

In magnetic recording and reproducing apparatus, information corresponding to substantially one frame or one field of television signal is generally recorded alternately by two magnetic recording and reproducing heads on a magnetic tape. The tape is moved obliquely along the peripheral surface of a cylindrical guide drum for a distance of substantially over half the circumference thereof. The magnetic recording and reproducing heads are mounted on the peripheral edge of a rotary disc, adapted to rotate in the center of said guide drum, and disposed at positions substantially diametrically opposed to each other. The information is magnetically recorded on the magnetic tape in the form of magnetic tracks, of substantial length, disposed obliquely with respect to the longitudinal axis of the tape. Each track contains the signals of substantially one field or one frame of television signals.

In effecting electronic editing of signals in such magnetic recording and reproducing apparatus, a system is used in which another new signal is recorded by the aforementioned magnetic recording and reproducing heads. The new signal is recorded on a magnetic tape on which one signal is already recorded. This new recording is accomplished by erasing the already recorded signal by means of a magnetic erasing head mounted immediately before the drum on the supply reel side.

Editing is to record, on a magnetic tape on which one signal is already recorded, another signal from a different signal source. This other signal may be recorded any time, as desired, by switching from the first signal to the other signal. To attain the end, it is essential that editing be effected in such a manner that no disturbance occurs in the produced pictures at a point on the tape at which switching from one signal to another is effected.

In a magnetic recording and reproducing apparatus for recording and reproducing television signals, for example, a normal picture image can be produced during recording by taking out a control signal from a vertical synchronizing signal contained in a video signal to be recorded. The control signal is used to generate a drive signal supplied to a motor for operating the rotary magnetic heads. This control signal is recorded near the upper edge or lower edge of the tape and reproduced when the recordings are reproduced. Thus, the drive signal can be supplied to drive the aforementioned motor to cause the rotary magnetic heads to accurately trace the magnetic tracks recorded on the magnetic tape.

If the rate of movement of the magnetic tape is constant, the intervals of pulses of the control signal will be uniform. If the intervals of pulses are not uniform, the rate of revolution of the magnetic recording and reproducing heads will not be constant, resulting in the occurrence of disturbance in synchronism of reproduced pictures. Thus, drifting will occur in the reproduced picture image for several minutes.

Such a magnetic recording and reproducing apparatus is used to record a new signal on a magnetic tape on which a video signal having a synchronizing signal is already recorded. The new video signal has another synchronizing signal. The new recording may start at any point, as desired, while the first video signal is being reproduced. The new recording is made by switching from a reproduction mode to a recording mode, and the position of the synchronizing signal of the new video signal may deviate from the regular position.

Synchronism may be disturbed, if the two synchronizing signals recorded on the magnetic tape are not properly aligned with each other. More specifically, the spacing between the switching point and the position at which a first control signal is recorded after switching is effected may vary from the spacing between the subsequent positions at which the control signal is recorded. Also, the spacing between the magnetic tracks recorded immediately after switching is effected may vary from the spacing between the magnetic tracks subsequently recorded. If the recordings made on the magnetic tape in the manner as aforementioned is reproduced, rotation of the rotary magnetic heads will be disturbed at the switching point and several minutes will elapse before a stabilized reproduced picture image is produced.

The present invention contemplates the provision of means whereby the synchronizing signals of two video signals of different programs can be automatically brought into agreement with each other in phase and frequency so as to accurately effect editing of signals, in order to prevent the occurrence of disturbance in synchronism at the time editing is effected.

Accordingly, one object of the invention is to provide a signal editing system for a magnetic recording and reproducing apparatus which can prevent the occurrence of disturbance in synchronism of signals at the time editing is effected.

Another object of the invention is to provide a signal editing system for a magnetic recording and reproducing apparatus. The system permits to record, on a magnetic tape on which one signal is already recorded, another signal from a television camera. The new recording may start at any point, as desired, in the recorded signal. The two signals are edited in perfect synchronism with each other.

Still another object of the invention is to provide a signal editing system for magnetic recording and reproducing apparatus. The rate of movement of the magnetic tape is varied when the synchronizing signals of two video signals, to be edited, vary from each other. Variation may be in phase and frequency. The rate of tape movement varies so as to bring the synchronizing signals into agreement with each other in phase and frequency. Thus editing and recording can automatically be started the moment this agreement in phase and frequency is brought about.

Additional objects and advantages of the present invention will become evident when the description set forth below is considered in conjunction with the accompanying drawings, in which.

Figure 1:
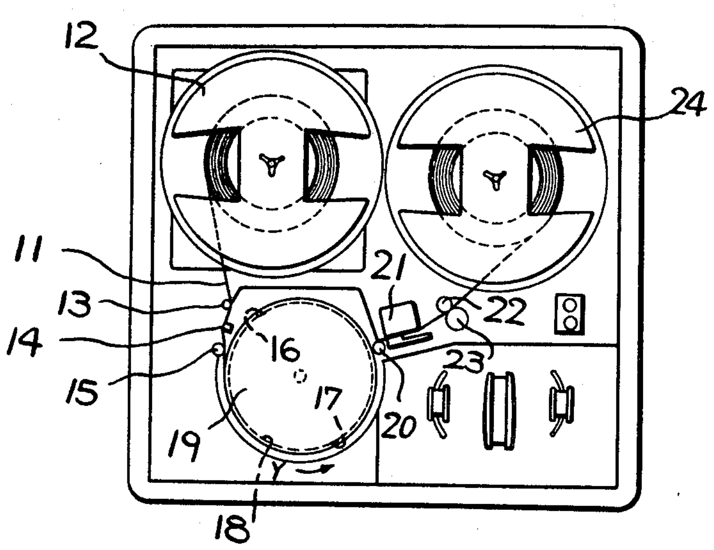
FIG. 1 is a plan view of an apparatus for magnetically recording and reproducing video signals in which the system according to this invention can be incorporated.
Figure 2:
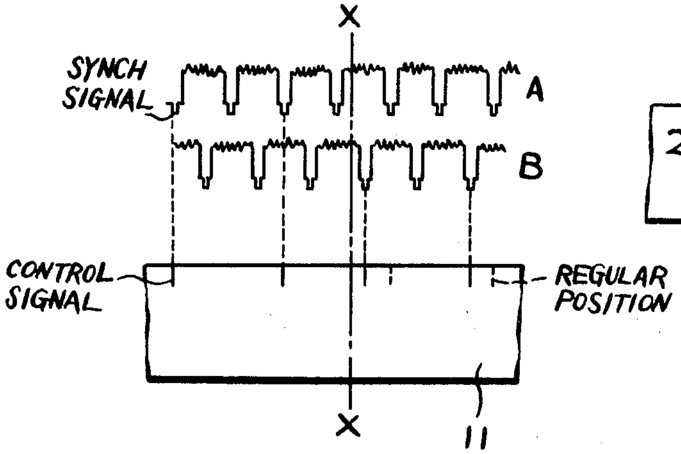
FIG. 2 is a graphical view showing the relationship between two signals to be edited and the positions of control signals on a magnetic tape.

FIG. 1 shows an apparatus for magnetically recording and reproducing video signals in which the system according to this invention can apply. A magnetic tape 11 is unwound from a supply reel 12. First, it passes tape guide roller 13 and then is brought into contact with a magnetic erase head 14, and a second tape guide roller 15. The tape is moved obliquely along the peripheral surface of a guide drum 19 for a distance corresponding to substantially more than half the circumference thereof. Mounted inside the drum is a rotary magnetic head 18 consisting of a plurality of magnetic recording and reproducing heads 16 and 17 for recording and reproducing video signals. After leaving the drum, the tape passes by a third tape guide roller 20, and then is brought into contact with a fixed magnetic recording and reproducing head block 21 for recording and reproducing audio signals, control signals and the like on the tape 11. Head 21 records at the upper or lower marginal portion thereof in the direction of movement of the tape. After passing head 21, the tape is held between a capstan 22 and a pinch roller 23 to be moved in the direction of arrow Y at a predetermined constant speed at all times. The capstan 22 is rotated by a capstan motor rotating at a constant number of revolutions determined by the constant frequency of a power source. Finally, the tape is wound on a takeup reel 24.

Figure 6:
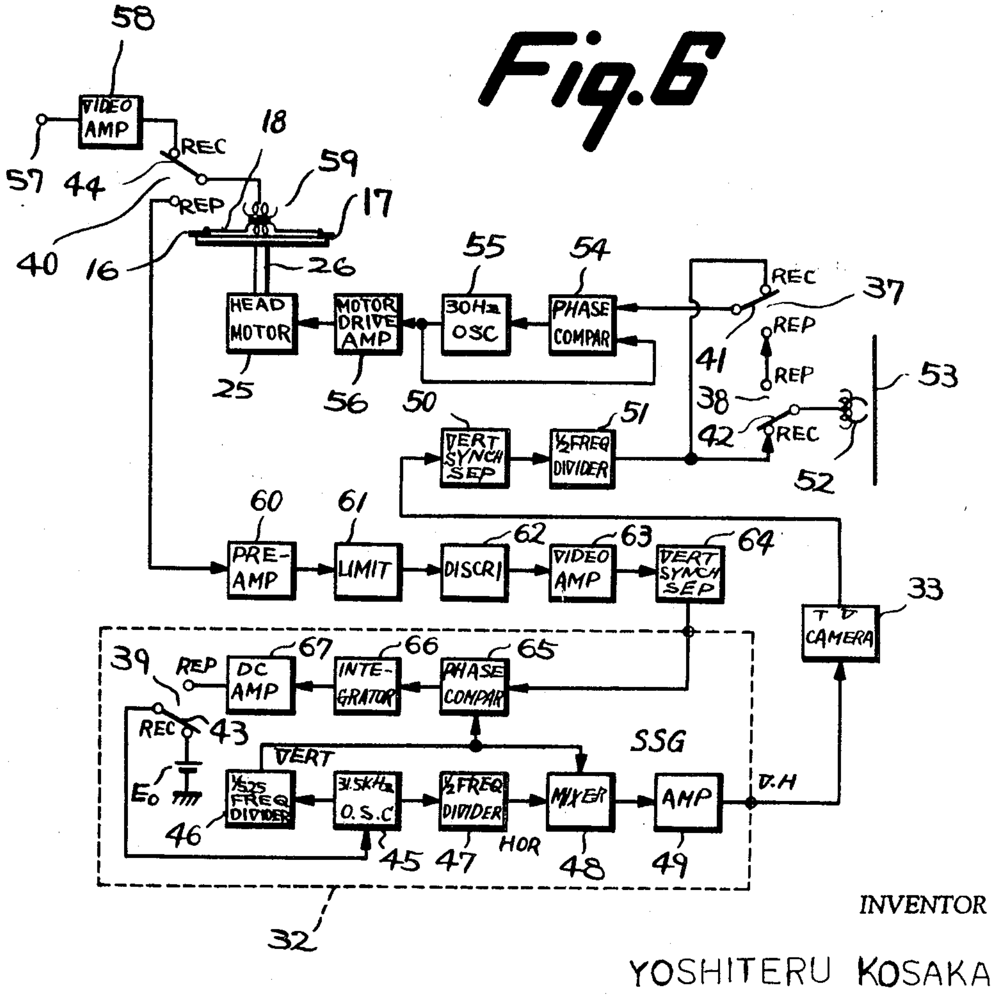
FIG. 6 is a systematic block diagram showing more in detail the elements shown in the simplified block diagram of FIG. 5.
Figure 7:
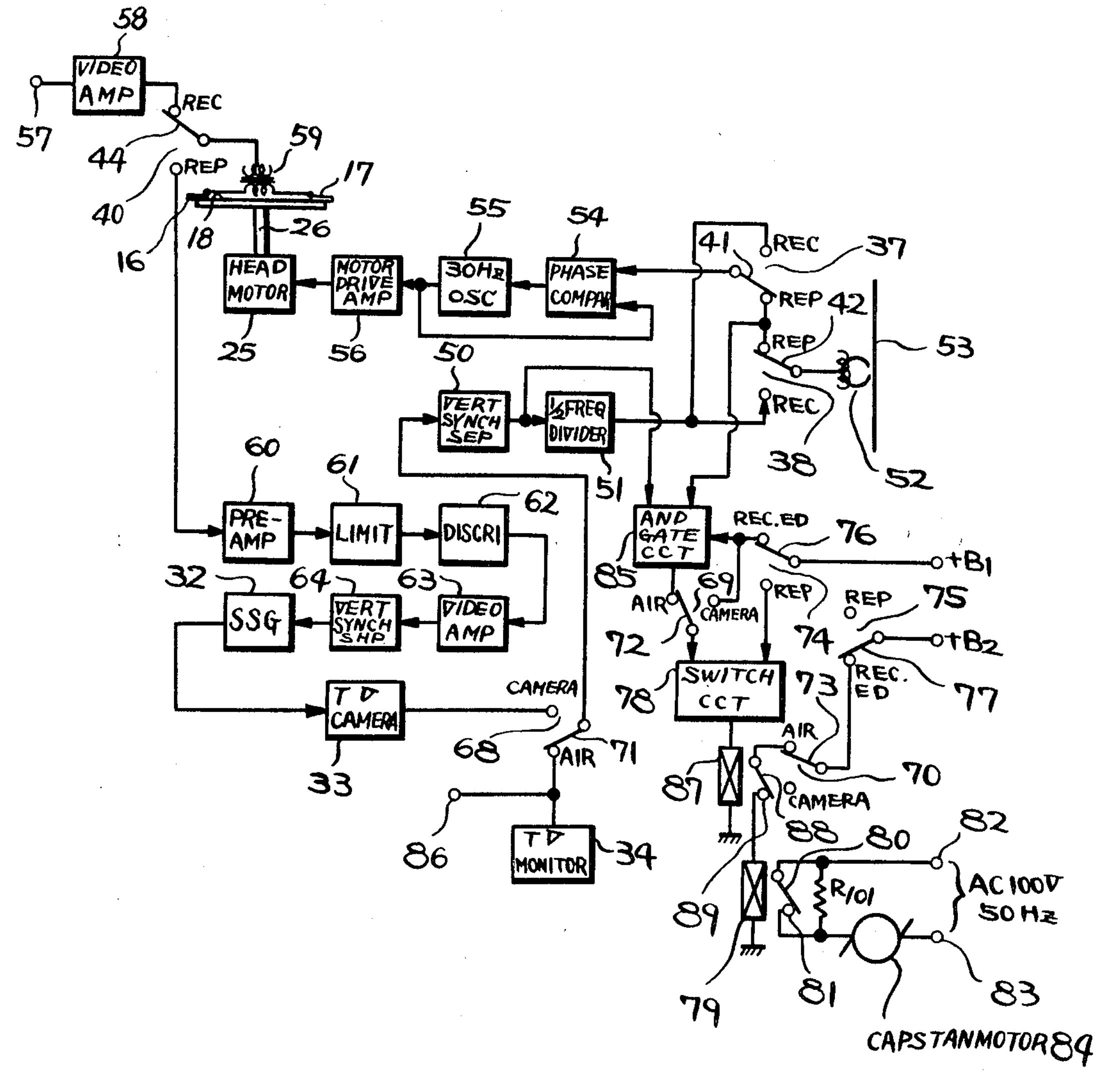
FIG. 7 is a systematic block diagram showing another embodiment of the system according to this invention.

The rotary magnetic head 18 consists of a pair of magnetic recording and reproducing heads 16 and 17 mounted at diametrically opposed positions on the peripheral edge of a rotary member. This member is rotatable in a plane normal to the centerline of the guide drum 19. The drum and rotary member are coaxial with a rotary shaft 26 of a rotary magnetic head drive motor 25 and coincident with said rotary shaft as shown in FIGS. 1, 6 and 7.

Figure 3:
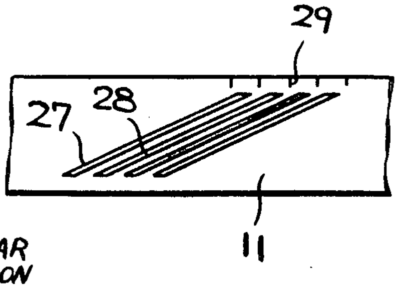
FIG. 3 is a schematic view of a fragment of magnetic tape showing the magnetic tracks formed on the magnetic tape used with the apparatus of FIG. 1.

The magnetic tape 11 is moved along the peripheral surface of the guide drum, obliquely, with respect to the centerline thereof. Hence video signal tracks formed by the magnetic recording and reproducing heads 16 and 17 on the magnetic tape 11 are in the form of recorded tracks or lines 27 and 28 disposed obliquely with respect to the longitudinal axis of the magnetic tape 11 as shown in FIG. 3. In this embodiment, the rate of revolution of the rotary magnetic head 18 is selected such that information corresponding to slightly more than one field of television signal is recorded on each of the magnetic tracks 27 and 28. Therefore, the same signal can, for example, be recorded at the upper end of magnetic track 27 and at the lower end of the magnetic track 28. It is to be understood that information corresponding to one frame of television signal, instead of one field thereof, can be recorded on each of the magnetic tracks.

As shown in FIG. 3, the vertical synchronizing signal of the recorded video signal is recorded in the form of a control track 29 at the upper marginal portion of the tape. Alternatively it could be recorded on the lower marginal portion of the magnetic tape 11. This is the control signal that is recorded and played back by the magnetic head mounted in the fixed magnetic recording and reproducing head block 21.

To edit a recording which has already been made on the magnetic tape 11, another new signal may be recorded by starting at any point on the previously recorded tape, such as halfway through the recorded signal, for example. The new signal, for example, may be a television signal, frequency modulated heads 16 and 17. An erasing high frequency current is supplied to the magnetic erase head 14 simultaneously with the new signal. The new television signal will then be recorded on the magnetic tape 11 by the magnetic recording and reproducing heads 16 and 17 while the signal on the magnetic tracks already recorded on the magnetic tape 11 is erased by the magnetic erase head 14. To make an electronic editing of a signal in this way, there is a requirement that has to be met, as set forth hereunder.

Figure 4:
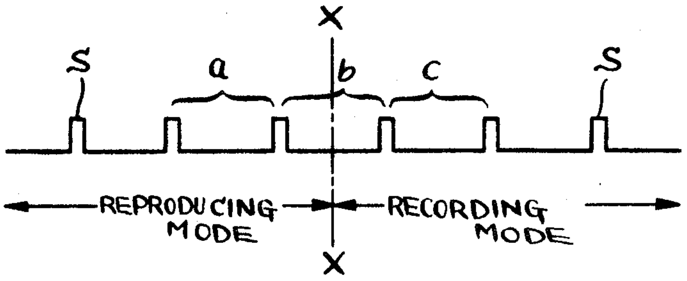
FIG. 4 is a graphical view showing pulses of control signals in explanation of the system according to this invention.

When the editing or new video signal starts at a random point X–X on the magnetic tape, it may be halfway through the recorded signal. In switching from a reproduction mode to a recording mode, as shown in FIG. 4, the spacing *a* should be equal to the spacing *c*. Spacing *a* appears between the pulses *s* of the control signal of the reproduced video signal in the reproduction mode. Spacing *c* appears between the pulses *s* of the control signal of the recorded signal in the recording mode. The spacing *b* occurs between the last pulse *s* of the control signal in the reproduction mode and the first pulse *s* of the control signal in the recording mode. Spacing *b* should also be equal to the aforementioned spacing *a*. That is, the requirement that has to be met in effecting editing satisfactorily is that the spacings $a=b\times c$.

Now, one embodiment of the system according to this invention will be explained with reference to FIG. 5. First to be explained is an apparatus for magnetically recording and reproducing video signals (VTR) 30 used in this embodiment. The tape player VTR 30 is provided with a servosystem which permits the rotary magnetic head to operate in synchronism with the vertical synchronizing signal of an input video signal. At the same time, a control signal is recorded at the upper marginal portion or lower marginal portion of the magnetic tape. The rotary magnetic head pulses are obtained by dividing the vertical synchronizing signal into two halves during a recording operation. The servosystem also permits the rotary magnetic head to operate in synchronism with the control signal reproduced from the magnetic tape during the playback or reproduction operation.

The tape player VTR 30 can reproduce video signals that are recorded on the magnetic tape. In switching the tape player VTR 30 to a reproduction mode, a movable contact member 36 of a switch 35 is moved into contact with a fixed contact member REP. Then, the magnetic recording and reproducing heads of the rotary magnetic head play back the video signals already recorded on the magnetic tape. At the same time, the reproduced video signals are supplied to a vertical synchronizing signal separator 31 for separating only the vertical synchronizing signals from the video signals. A synchronizing signal generator 32 is connected to the separator 31. A television camera 33 is controlled by the output of either the separator 31 or the vertical synchronizing signal. A monitor television receiver 34 is connected to the output of the tape player VTR 30.

In switching the tape player VTR 30 to a recording mode, the movable contact member 36 of the switch 35 is moved into contact with a fixed contact member REC. Then the video signals from the television camera 33, as well as the control signals, will be recorded on the magnetic tape.

A new editing video signal, from the television camera 33, is recorded on the magnetic tape in the tape player VTR 30. The editing may begin by starting at a point on the tape which is halfway through the recorded video signal, or as shown at X–X in FIG. 4. The spacing *a* and spacing *b* between the pulses of the control signal will be equal to each other in a reproduction mode as shown in FIG. 4, because the synchronizing signal of the output video signal of the television camera 33 is synchronous with the synchronizing signal of the video signal already recorded on the magnetic tape when the VTR 30 is in a reproduction mode. The synchronizing signal generator 32 will control the television camera 33 of its own accord. Generator 32 continues to generate a fixed frequency, even in the absence of the output video signal from the tape player VTR 30 after being switched to a recording mode. If, therefore, the frequency generated by the self-running of the synchronizing signal generator 32 were made equal to the frequency of the vertical synchronizing signal of the video signal already recorded on the tape, the spacings *a* and *b* between the pulses of the control signal would become equal to each other in a recording operation. Thus, the aforementioned requirement for satisfactorily effecting editing would be met and no disturbance would occur in synchronism.

Figure 5:
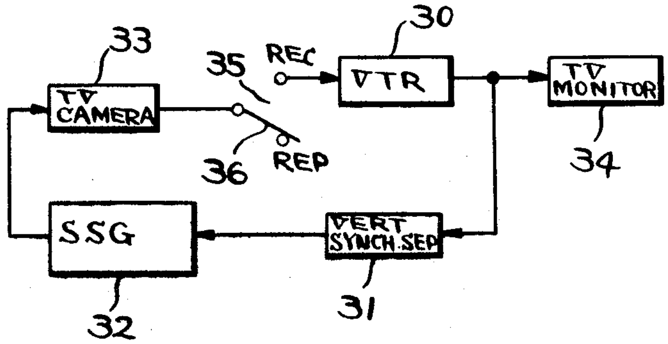
FIG. 5 is a simplified block diagram showing one embodiment of the system according to this invention.

FIG. 6 is a systematic block diagram which shows in greater detail the first embodiment of the signal editing system according to this invention shown in FIG. 5. In FIG. 6, movable contact members 41, 42, 43 and 44 of switches 37, 38, 39 and 40 are moved into contact with fixed contact members REC thereof in a recording operation. These same movable contact members are moved into contact with fixed contact members REP thereof in a reproduction operation.

Now, when a video signal from the television camera 33 is recorded, a 31.5 kHz. oscillator 45 in the synchronizing signal generator 32 is adjusted so that the oscillator generates a signal of 31.5 kHz. when a predetermined voltage is applied thereto. The predetermined voltage $E_0$ is applied from a power source through the switch 39. The signal of 31.5 Hz. is simultaneously transmitted, on one hand, to a 1/525 frequency divider 46 to provide a vertical synchronizing signal of 60 Hz.

On the other hand, a one-half frequency divider 47 provides a horizontal synchronizing signal of 15.72 kHz. The vertical synchronizing signal and the horizontal synchronizing signal are mixed at a mixer 48 into a composite signal which is amplified at an amplifier 49 and supplied to a vertical and horizontal synchronizing signal input terminal of the television camera 33.

A video signal is taken out through an output terminal of the television camera 33 and supplied to a vertical synchronizing signal separator 50 in the tape player VTR. Only the vertical synchronizing signal of 60 Hz. is separated and taken out. The vertical synchronizing signal is transmitted to a one-half frequency divider 51 where it is converted into a vertical synchronizing signal of 30 Hz. The vertical synchronizing signal of 30 Hz. is supplied to a fixed magnetic control signal recording and reproducing head 52 through the switch 38 so as to be recorded as a control signal on a magnetic tape 53 at the upper marginal portion or the lower marginal portion thereof. On the other hand, the 30 Hz. signal is also supplied through the switch 37 to a phase comparator 54 where it is compared with the 30 Hz. output signal of a 30 Hz. oscillator 55 which is also supplied to the comparator. The output signal of the phase comparator 54 is supplied to the oscillator 55 as its modulated input. The 30 Hz. output signal of the oscillator 55 is also supplied to a motor drive amplifier 56 where it is amplified. The output of this amplifier drives the rotary magnetic head drive motor 25. The rotary magnetic head 18 is directly connected to the rotary shaft 26 of the motor 25 so that it is rotated at a rate of 30 revolutions per second.

The rotary magnetic head drive motor 25 is a phase locking synchronous motor which has, as described in U.S. Pat. No. 3,385,926, a ferrite permanent magnet mounted on its rotary shaft for rotation with its rotor as a unit. It is possible to drive the motor by an open loop servosystem.

A video signal to be recorded is supplied through a terminal 57 and amplified at a video amplifier 58. Then, the video signal is passed through the switch 40 and a rotary transformer 59 and applied to the magnetic recording and reproducing heads 16 and 17 of the rotary magnetic head 18. The video signal can be recorded by the heads on the magnetic tape in the form of magnetic tracks obliquely disposed with respect to the longitudinal axis of the tape. The length of each oblique track is sufficient to contain information corresponding to about one field or one frame of television signal in each track.

It will thus be appreciated that the video signal and the control signal recorded on the magnetic tape 53 are disposed in a predetermined relation with each other.

Now, when the video signals and control signals recorded on the magnetic tape 53 are reproduced, the magnetic tracks containing the video signals recorded on the tape are traced by the magnetic recording and reproducing heads 16 and 17 of the rotary magnetic head 18. The reproduced video signals are taken out by the rotary transformer 59. The reproduced video signal is amplified at a preamplifier 60, limited at a limiter 61, and discriminated at a discriminator 62. After being discriminated, the reproduced video signal is amplified at a video amplifier 63 and supplied to a vertical synchronizing signal separator 64. A vertical synchronizing signal is separated from the video signal and supplied to a phase comparator 65 in the synchronizing signal generator 32. Supplied to the phase comparator 65 simultaneously with the vertical synchronizing signal is a vertical synchronizing signal of 60 Hz. which is formed at the 1/525 frequency divider 46 from a 31.5 Hz. signal generated by the 31.5 Hz. signal oscillator 45.

The output signal of the phase comparator 65 produced after these two vertical synchronizing signals are compared. This output is applied through an integrator 66, a DC amplifier 67, and the switch 39, to control the 31.5 Hz. oscillator 45. Thus the output signal of the synchronizing signal generator 32 may be locked to the vertical synchronizing signal of the reproduced video signal. The 60 Hz. vertical synchronizing signal is mixed, at the mixer 48, with the 15.75 kHz. horizontal synchronizing signal formed at the one-half frequency divider 47 to provide a composite synchronizing signal which is amplified at the amplifier 49 and transmitted to the television camera 33.

It will be appreciated that the signals of the television camera 33 are always synchronous with the composite synchronizing signals supplied from the synchronizing signal generator 32 and synchronous with the reproduced video signals.

On the other hand, the magnetic tracks of control signals on the magnetic tape 53 are traced by the fixed magnetic control signal recording and reproducing head 52. The reproduced control signal is supplied, through the switches 38 and 37, to the phase comparator 54 to which is simultaneously supplied the 30 Hz. output signal of the 30 Hz. oscillator 55. The phases of two signals are compared with each other in phase at the phase comparator 54 whose output signal is supplied to the 30 Hz. oscillator. The 30 Hz. output is fed back as a modulated input of said comparator 54. The 30 Hz. output signal of the oscillator 55 is also supplied to the motor drive amplifier 56 where it is amplified and then used to drive the rotary magnetic head drive motor 25. The rotary magnetic head 18 is directly connected to the rotary shaft of the motor so that it can be rotated at a rate of 30 revolutions per second.

It will be understood from the foregoing description that, according to the signal editing system of this invention, a video signal and a control signal can be recorded at regular positions on a magnetic tape, on which a video signal is already recorded. The editing change begins at the point at which switching is effected from a reproduction mode. This switching is made to a recording mode by means of the switch of a tape player VTR, when it is desired to edit a video signal from a television camera and said video signal already recorded on the magnetic tape.

In this case, the composite synchronizing signal is cut off from the reproduced video signal when the tape player VTR is switched to a recording mode, so that the television camera must be brought to a synchronism by self-running oscillation. Thus, the television camera that can be used in this case must be one which can be operated by a composite synchronizing signal supplied from outside.

A nonstable multivibrator is generally used as a synchronizing signal generator, but synchronism cannot be achieved by using this synchronizing signal generator unless its self-generating frequency is lower than the frequency of the synchronizing signal. Thus, the relation of the spacings *a* and *b* (FIG. 4) between the pulses of the control signal, must be $b>a$. However, no inconveniences are experienced for practical purposes if the spacings *a* and *b* are made as nearly equal as possible.

The synchronizing signal generator 32 may be incorporated in either the tape player VTR 30 (FIG. 5) or the television camera 33. It is to be understood, however, that the generator 32 may, if possible, be used as a separate entity and connected by cables to the tape player VTR and the television camera.

In the embodiment explained above, the video signal to be recorded by editing has been described as an output video signal of a television camera, but it is to be understood that other video signals, such as input video signals of the television receiver, for example, may also be used.

Another embodiment of the signal editing system according to this invention will now be explained. In this embodiment, reproduced video signals from tape players VTR other than the tape player VTR to be used. Any video signals which are not in synchronism with the reproduced video signals from the tape player VTR may be used in this embodiment. Input signals of television receivers which are not in synchronism with the reproduced video signals from the tape player VTR of this embodiment (which are to be hereinafter referred to as AIR signals) are recorded, by editing, on a magnetic tape in the tape player VTR. Editing in this embodiment occurs responsive to the switching to a recording operation and may start at any point on the tape, such as halfway through the recorded video signal.

Figure 8:
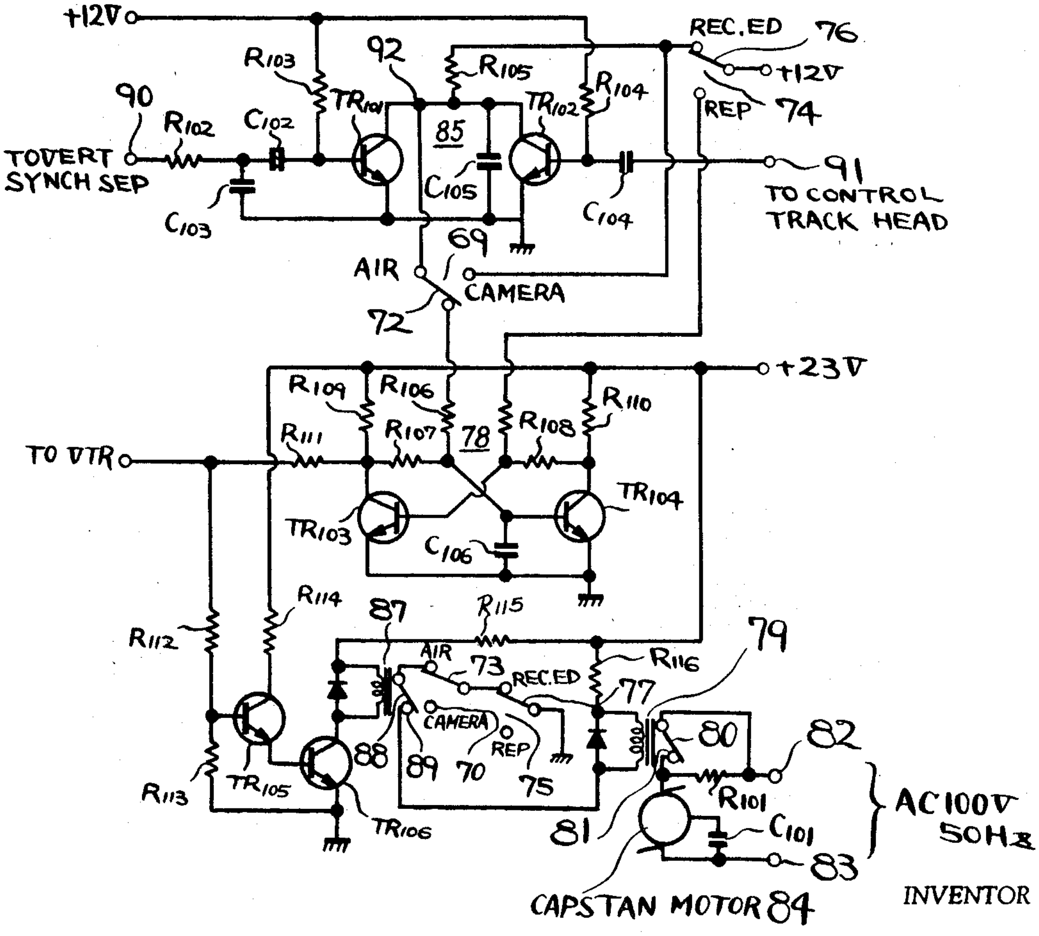
FIG. 8 is a schematic circuit diagram showing essential portions of the systematic block diagram shown in FIG. 7.

FIGS. 7 and 8 are in explanation of this other embodiment. In FIGS. 5, 6 and 7, like reference characters designate similar parts, many of which have already been described. Thus, the explanation of these parts will be omitted for the sake of brevity.

In FIG. 7 which shows this embodiment, there are shown switches 68, 69 and 70 having movable contact members 71, 72 and 73 respectively. When the movable contact members 71, 72 and 73 are moved into contact with fixed contact members CAMERA or AIR thereof, the tape player VTR can be switched and made ready for recording either a video signal from a television camera or an AIR signal by editing.

Switching from normal recording to normal reproduction or vice versa is effected by means of the switches 37 and 38, as well as 74 and 75. More specifically, in a normal recording operation, the movable contact members 41, 42, 76 and 77 of the switches 37, 38, 74 and 75 are moved into contact with fixed contact members REC thereof. In a reproduction operation they are moved into contact with fixed contact members REP thereof. The operation performed when the movable contact members 71, 72 and 73 of the switches 68, 69 and 70 are moved into contact with the fixed contact members CAMERA thereof for recording and reproduction is similar to the operation performed in the first embodiment described previously, so the explanation thereof will be omitted.

The movable contact members 71, 72 and 73 of the switches 68, 69 and 70 are moved into contact with the fixed contact members AIR thereof, and the movable contact members 41, 42, 76 and 77 of the switches 37, 38, 74 and 75 are moved into contact with the fixed contact members REP thereof for effecting normal reproduction of video signals and control signals already recorded on the magnetic tape. The VTR will begin to reproduced recordings because a mode changeover switch 78 is in a reproduction mode. At this time, a voltage $+B_2$ is not applied to the coil of a relay 79, so that the relay 79 is in a released position. Consequently a movable contact member 80 and a fixed contact member 81 of the relay are closed. This permits an AC current (AC 100 v., 50 Hz.) from power source terminals 82 and 83 to be applied directly to a capstan motor 84. The capstan rotates at a constant rate to thereby move the magnetic tape 53 at a predetermined rate. On the other hand, the head servosystem is actuated in the same manner as in the first embodiment described previously.

It is desired to record an AIR signal by editing on the magnetic tape on which a video signal is already recorded. Editing may begin by starting at any point, as desired which may be halfway through the video signal already recorded on the tape. The movable contact members 76 and 77 of the switches 74 and 75 are moved into contact with fixed contact members REC, ED thereof. The movable contact members 41 and 42 of the switches 37 and 38 are maintained in contact with the fixed contact members REP thereof.

An AIR signal to be recorded by editing is supplied through an input terminal 86, and the switch 68, to the vertical synchronizing signal separator 50. The vertical synchronizing signal is separated from the AIR signal and supplied to the output of an AND gate circuit 85 which generates output signal pulses only when synchronizing signals of two different video signals coincide with each other in phase. On the other hand, the vertical synchronizing signal which has been recorded as a control signal at the upper marginal portion or the lower marginal portion of the magnetic tape 53 simultaneously with the recording of a video signal on said magnetic tape by the tape player VTR reproduced by the magnetic control signal recording and reproducing head 52 and supplied through the switch 38 to said AND gate circuit 85. If the vertical synchronizing signals and the recorded control signals do not coincide whey they are supplied to the AND gate circuit 85, they are out of phase with each other, and no output signal is produced at the output of AND gate 85. The mode changeover switching circuit 78 remains switched to the reproduction mode, and a relay 87 is maintained in the off position.

A voltage $+B_1$ is supplied to the AND gate circuit 85 through the switch 74, and a voltage $+B_2$ is supplied to the coil of relay 79 through the switches 75 and 70 and movable and fixed contact members 88 and 89 of the closed relay 79. Accordingly, if the relay 87 is operated, then the voltage $+B_2$, the movable and fixed contact members 80 and 81 of the relay 79 are opened. Thus, a resistor $R_{101}$ and the capstan motor 84 are effectively connected in series with each other. This results in the capstan motor 84 rotating at a rate lower than the predetermined constant rate of revolution in a normal reproduction mode. Accordingly, the rate of movement of the magnetic tape 53 is reduced.

As the rate of movement of the magnetic tape 53 is reduced, the synchronizing signal of the reproduced video signal on the magnetic tape is delayed. An output signal is generated by the AND gate circuit 85 when the synchronizing signal agrees in phase with the synchronizing signal of the video signal from outside. The AND output gate signal is transmitted through the switch 69 to the mode changeover switching circuit 78 which switches the tape player VTR from a reproduction mode to a recording mode. At the same time, the relay 87 operates.

Upon being switched to a recording mode, the tape player VTR begins to record the AIR signal. Since the relay 87 is in the operated position at this time, the movable contact member 88 and the fixed contact member 89 are opened to released the relay 79. Thus, the movable contact member 80 and the fixed contact member 81 are closed and a resistor $R_{101}$ is short circuited at its opposite ends, whereby the capstan motor 84 can begin to rotate at the predetermined constant rate again.

In this connection, caution should be exercised not to reduce the rate of revolution of the capstan motor 84 too greatly. If the value of resistor $R_{101}$ were too large and consequently the rate of revolution of the capstan motor 84 were reduced too much when the relay 79 is in an operated position, there would be too great a difference in the respective frequencies of the synchronizing signals of two video signals. Moreover, the inertia of the capstan motor 84 would cause an irregularity in the rate of revolution of the rotary magnetic head drive motor 25. Thus, the rotary magnetic head would become irregular immediately after the switching of mode, and this would result in disturbance of the head servosystem.

In this embodiment (FIG. 7), the resistor $R_{101}$ is used to reduce the rate of movement of the magnetic tape so as to delay the synchronizing signal in phase. However, it is to be understood that there may be an increase of the capacitance of a capacitor $C_{101}$ (FIG. 8) connected to an auxiliary winding of the capstan motor 84. For example, another capacitor may be connected in shunt to the capacitor $C_{101}$ by using the movable contact member 80 and the fixed contact member 81 of the relay 79. The rate of revolution of the capstan motor 84 may be increased by the added capacitance to thereby increase the rate of movement of the magnetic tape and advance the synchronizing signal in phase.

FIG. 8 is a schematic circuit diagram showing the essential portions of the embodiment shown in FIG. 7. In FIG. 8, the vertical synchronizing signal of the AIR signal is supplied through an input terminal 90. This signal is applied to the base of a transistor $TR_{101}$ via a resistor $R_{102}$, capacitor $C_{102}$, and to the emitter of transistor $TR_{101}$ via a capacitor $C_{103}$. The vertical control signal of the reproduced control signal is supplied through another input terminal 91. This signal is applied to the base of a transistor $TR_{102}$ via a capacitor $C_{104}$. A bias voltage +12 v. is applied to the bases of these two transistors $TR_{101}$ and $TR_{102}$ through resistors $R_{103}$ and $R_{104}$ respectively. The transistors $TR_{101}$ and $TR_{102}$, a resistor $R_{105}$, and a capacitor $C_{105}$ make up the AND gate circuit 85 which combines the vertical synchronizing signal and the vertical synchronizing signal of the reproduced control signal.

When the movable contact member 76 of the switch 74 is moved into contact with the fixed contact member REC, ED thereof in effecting recording by editing, a voltage +12 v. will be applied to the collectors of the transistors $TR_{101}$ and $TR_{102}$. The output signal pulses will be generated through collector junctions 92 of the transistors $TR_{101}$ and $TR_{102}$ when the vertical synchronizing signal of the AIR signal and the vertical synchronizing signal of the reproduced control signal coincide with each other in phase. These output signal pulses operate the switching circuit 78, through the switch 69 and a resistor $R_{106}$, into a known mode changeover switch circuit made up of a pair of transistors $TR_{103}$ and $TR_{104}$, resistors $R_{107}$, $R_{108}$, $R_{109}$ and $R_{110}$, and a capacitor $C_{106}$. A voltage +23 v. is applied to the collector of transitor $TR_{103}$ through the resistor $R_{109}$ and to the transistor $TR_{104}$ through the resistor $R_{110}$.

Upon actuation of the mode changeover switch circuit 78, an output signal is generated by the circuit and transmitted through a resistor $R_{111}$ to the tape player VTR which is switched by the signal to a recording mode. The player then begins to record the AIR signal. At the same time, said output signal is applied through a resistor $R_{112}$ to the base of a transistor $TR_{105}$ which makes up an amplifier together with a transistor $TR_{106}$ and resistors $R_{113}$ and $R_{114}$, so that the signal is amplified. The amplified signal is introduced into the coil of the relay 87, which operates. Thereupon, the movable contact member 88 is moved away from the fixed contact member 89 to thereby release the relay 79. The movable contact member 80 then closes a circuit through the fixed contact member 81. Thus, the resistor $R_{101}$ is short circuited on its opposite ends, and the capstan motor 84 rotates at the predetermined constant rate of revolution. A capacitor $C_{101}$ is connected to the auxiliary winding of the capstan motor 84.

The constants of circuit elements of the circuits shown in FIG. 8 are as follows:

| Symbol | Part | Resistance or electrostatic capacity |
|---|---|---|
| $R_{101}$ | Resistor | 82Ω (6w.) |
| $R_{102}$ | do | 10 kΩ |
| $R_{103}$ | do | 100 kΩ |
| $R_{104}$ | do | 100 kΩ |
| $R_{105}$ | do | 5.6 kΩ |
| $R_{106}$ | do | 5.6 kΩ |
| $R_{107}$ | do | 22 kΩ |
| $R_{108}$ | do | 22 kΩ |
| $R_{109}$ | do | 6.8 kΩ |
| $R_{110}$ | do | 6.8 kΩ |
| $R_{111}$ | do | 5.6 kΩ |
| $R_{112}$ | do | 10 kΩ |
| $R_{113}$ | do | 10 kΩ |
| $R_{114}$ | do | 6.8 kΩ |
| $R_{115}$ | do | 180Ω (2w.) |
| $R_{116}$ | do | 220Ω |
| $C_{101}$ | Capacitor | 4 μf. |
| $C_{102}$ | do | 1/15 μf. |
| $C_{103}$ | do | 0.01 μf. |
| $C_{104}$ | do | 0.01 μf. |
| $C_{105}$ | do | 0.047 μf. |
| $C_{106}$ | do | 1,000 pf. |

While the present invention has been shown and described with reference to preferred embodiments thereof, it is to be understood that the invention is not limited to the specific details thereof, and that many modifications and changes may be made therein without departing from the spirit and scope of the invention.

I claim:

1. A signal editing system for a magnetic recording and reproducing apparatus which includes at least one rotary magnetic head for recording on and reproducing from one portion of a magnetic tape a video signal having vertical and horizontal synchronizing signals, means for producing a control signal from the vertical synchronizing signal, a fixed magnetic head for recording on and reproducing from another portion of the magnetic tape said control signal, means responsive to said control signal for rotating the rotary magnetic head in synchronism with the control signal; said last-named means comprising first separator means for separating the vertical synchronizing signal from the video signal reproduced by said rotary magnetic head during the reproducing mode of said apparatus; camera means for generating a second video signal; synchronizing signal generator means for generating second vertical and horizontal synchronizing signals which are inserted into the second video signal; means for synchronizing said second vertical synchronizing signal with the output signal of said first separator means; second separator means for separating said second vertical synchronizing signal from the output of said camera means; means for producing a second control signal responsive to the output of said second separator means; means for recording the output of said camera means on said one portion of the magnetic tape; means for recording said second control signal on the other portion of the magnetic tape; means responsive to the supplying of a video signal to said first separator means for separating the first vertical synchronizing signal from the video signal during the recording of the output of said camera; and means for stopping the recording of said second control signal while said rotary magnetic head reproduces the video signal from said one portion of the magnetic tape.

2. A signal editing system for a magnetic recording and reproducing apparatus which includes at least one rotary magnetic head for recording on and reproducing from one portion of a moving magnetic tape a video signal having vertical and horizontal synchronizing signals, means for producing a control signal from the vertical synchronizing signal, a fixed magnetic head for recording on and reproducing from another portion of the magnetic tape said control signal, a motor for moving the magnetic tape at a predetermined velocity by a current flowing therethrough from a power supply, means responsive to said control signal for rotating the rotary magnetic head in synchronism with the control signal; said last-named means comprising first separator means for separating the vertical synchronizing signal from the video signal reproduced by said rotary magnetic head during the reproducing mode of said apparatus; camera means for generating a second video signal; synchronizing signal generator means for generating second vertical and horizontal synchronizing signals which are inserted into the second video signal; means for synchronizing said second vertical synchronizing signal with the output signal of said first separator means; second separator means for separating the vertical synchronizing signal; means for selectively supplying to the second separator means either the output signal of the camera means or a third video signal having third vertical and horizontal synchronizing signals; means for producing a second control signal from the output of said second separator means; first combination means operative when the output signal of the camera means is supplied to the second separating means, said combination means including means for recording the output signal of said camera means on said one portion of the magnetic tape, and means for recording said second control signal on the other portion of the magnetic tape; second combination means operative when the third video signal is supplied to the second separating means, said last-named means including means for inserting an impedance element between said motor and said power supply in response to the supply of the third video signal to the second separator means, whereby current through the motor is decreased to reduce the velocity of the magnetic tape from the predetermined velocity, and AND gate circuit for combining said second vertical synchronizing signal with the control signal reproduced by the fixed magnetic head and generating an output signal only when said second vertical synchronizing signal coincides in time with the control signal reproduced by the fixed magnetic head, means responsive to the generation of the output signal from said AND gate circuit for short circuiting said impedance element, means responsive to the generation of the output signal from said AND gate circuit for recording said third video signal on said one portion of the magnetic tape, and means responsive to the generation of the output signal from said AND gate circuit for recording said second control signal on the other portion of the magnetic tape; means responsive to the supplying of a video signal to said first separator means for separating the first vertical synchronizing signal from the video signal, during the recording mode of said apparatus; and means for stopping the recording of said second control signal during the reproducing mode of said apparatus.